(12) United States Patent
Fischer (10) Patent No.: US 10,470,120 B2
(45) Date of Patent: Nov. 5, 2019

(54) POWER COMPENSATOR FOR CELLULAR COMMUNICATION BASE STATION

(71) Applicant: T-Mobile USA, Inc., Bellevue, WA (US)

(72) Inventor: Steve Fischer, Windsor, CO (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/194,200

(22) Filed: Nov. 16, 2018

(65) Prior Publication Data

US 2019/0289541 A1   Sep. 19, 2019

Related U.S. Application Data

(60) Provisional application No. 62/643,051, filed on Mar. 14, 2018.

(51) Int. Cl.
*H04W 52/02* (2009.01)
*H04W 52/00* (2009.01)
(Continued)

(52) U.S. Cl.
CPC ... *H04W 52/0206* (2013.01); *H04W 52/0225* (2013.01); *H04W 52/22* (2013.01); *H04W 52/346* (2013.01)

(58) Field of Classification Search
CPC ......... H04W 52/0206; H04W 52/0225; H04W 52/22; H04W 52/346; H04W 52/00;
(Continued)

(56) References Cited

U.S. PATENT DOCUMENTS

| 6,801,788 | B1 | 10/2004 | Csapo et al. |
| 7,466,225 | B2 * | 12/2008 | White, II ............... H04B 3/56 |
| | | | 340/12.32 |

(Continued)

FOREIGN PATENT DOCUMENTS

| WO | 2009143487 A2 | 11/2009 |
| WO | 2011115640 A1 | 9/2011 |

OTHER PUBLICATIONS

International Application No. PCT/US2019/022133, International Search Report and Written Opinion dated Jul. 2, 2019, 10 pages.

*Primary Examiner* — Pablo N Tran
(74) *Attorney, Agent, or Firm* — Han Santos, PLLC (57) ABSTRACT

A power compensator for use in a cellular communication base station includes a voltage booster and an adaptive voltage boost controller. The voltage booster is coupled between a first port and a second port to apply a voltage boost to a power signal to generate a compensated power signal that is provided to a remote radio unit (RRU) of the base station. The adaptive voltage boost controller is configured to control the voltage boost applied by the voltage booster to compensate for a voltage loss across the power cable between the power compensator and the RRU. In operation, the adaptive voltage boost controller determines a value of the voltage boost to be applied by the voltage booster based on temperature data and electrical current sample data. The adaptive voltage boost controller then sends a control signal to the voltage booster to adjust the voltage boost based on the determined value.

20 Claims, 5 Drawing Sheets

(51) Int. Cl.
*G05F 1/62* (2006.01)
*H04M 19/00* (2006.01)
*H04W 52/22* (2009.01)
*H04W 52/34* (2009.01)

(58) Field of Classification Search
CPC ....... H04W 52/02; H04W 88/08; H04W 4/80; G05F 1/62; G05F 1/46; H04M 19/00; H02H 9/04; G01R 27/08; G01R 19/25; G01R 27/16; H04B 3/54
See application file for complete search history.

(56) References Cited

U.S. PATENT DOCUMENTS

| | | | | |
|---|---|---|---|---|
| 7,904,115 | B2* | 3/2011 | Hageman | H04W 52/0261 455/561 |
| 8,547,164 | B2* | 10/2013 | Flores | H03K 19/0016 327/513 |
| 9,281,866 | B2* | 3/2016 | Smentek | H04B 3/44 |
| 9,448,576 | B2* | 9/2016 | Chamberlain | G05F 1/62 |
| 9,472,956 | B2* | 10/2016 | Michaelis | H04B 10/807 |
| 9,485,723 | B2* | 11/2016 | Chakraborty | H04W 52/0203 |
| 9,681,317 | B2* | 6/2017 | Carlin | H04W 24/04 |
| 9,759,880 | B2* | 9/2017 | Chamberlain | H01Q 1/246 |
| 10,128,685 | B2* | 11/2018 | Hanley | H04B 3/44 |
| 10,281,939 | B2* | 5/2019 | Chamberlain | H02H 9/045 |
| 2006/0182262 | A1* | 8/2006 | Goldman | H04M 19/08 379/323 |
| 2007/0093204 | A1* | 4/2007 | Kincard | H01Q 1/246 455/13.3 |
| 2011/0021186 | A1 | 1/2011 | Fischer | |
| 2013/0031387 | A1 | 1/2013 | Whittam et al. | |
| 2014/0378047 | A1* | 12/2014 | Kennard | H04B 7/15535 455/22 |
| 2015/0015078 | A1* | 1/2015 | Kim | H03K 19/0175 307/103 |
| 2015/0080055 | A1* | 3/2015 | Smentek | H04B 3/44 455/561 |
| 2015/0109710 | A1* | 4/2015 | Politis | H02G 15/113 361/119 |
| 2015/0168974 | A1* | 6/2015 | Mascarenhas | H04L 12/10 700/297 |
| 2015/0326317 | A1* | 11/2015 | Michaelis | H04B 10/807 398/115 |
| 2016/0316430 | A1* | 10/2016 | Fischer | H02J 1/10 |
| 2018/0164355 | A1* | 6/2018 | Winkler | G01R 27/08 |

* cited by examiner

POWER COMPENSATOR FOR CELLULAR COMMUNICATION BASE STATION

CROSS-REFERENCE TO RELATED APPLICATION

This application claims the benefit of U.S. Provisional Application No. 62/643,051, entitled "SUPPLEMENTAL POWER CONTROLLER FOR REMOTE CELLULAR SITE," filed Mar. 14, 2018 and is expressly incorporated herein by reference in its entirety.

BACKGROUND

The popularity of commercial wireless communications services (e.g. wireless telephony, wireless network access, and wireless email) has substantially increased during recent years. In many cases, users are increasingly relying on these services for both personal and business communications. Typically, telecommunications service providers rely on cell sites, such as base stations, to facilitate some communications services and provide a reliable operation to their consumer base. However, at times, a cell site may unexpectedly experience power interruptions that impact a quality of communications services. Power interruptions may include power surges or power disruptions, albeit due to network congestion, or cell site hardware or software failures.

In some examples, a telecommunications service provider may face significant financial expenditure when dealing with power interruptions, particularly when technicians are required to identify, mitigate or repair the cause or effect of a power interruption.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

As mentioned above, cellular communication base stations of a wireless communication network provide wireless communication service to user devices. Effective power management of base stations is important for the smooth operation of the wireless communication network. For example, any increase in power consumption across tens of thousands of base station nodes can significantly impact the financial bottom line of the wireless communication network. Conversely, any decrease in power consumption across the tens of thousands of base station nodes can translate into real financial savings for the wireless communication network. Further, power fluctuations and/or power interruptions can impact the quality of the communication services provided by the wireless communication network. Furthermore, sending field teams to perform repairs on base station nodes caused by power surges or interruptions can be costly. Accordingly, techniques for automatically compensating for power fluctuations at the base station nodes can ensure the reliable operation of the base stations.

Figure 1:
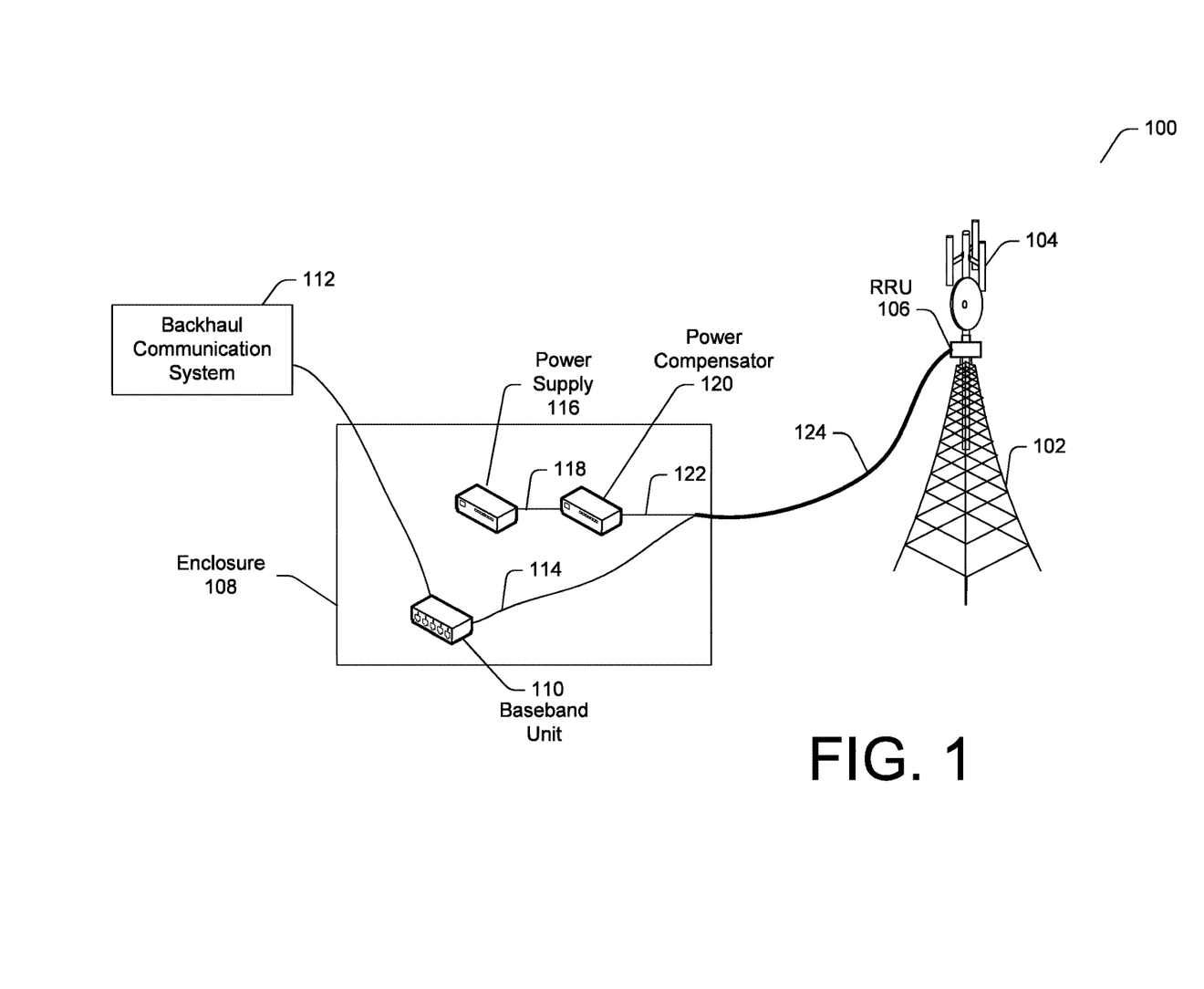
FIG. 1 illustrates an example architecture for a cellular communication base station that uses a power compensator.

Accordingly, aspects of the present disclosure include the deployment of a power compensator in the power supply architecture of a base station. An example architecture of the present disclosure is illustrated in FIG. 1.

A cellular communication base station 100 is illustrated as including a tower 102, one or more antennas 104, a remote radio unit (RRU) 106 (also referred to as a remote radio head (RRH)), a baseband unit 110, a power supply 116, and a power compensator 120. As shown in FIG. 1, the cellular communication base station 100 also includes an equipment enclosure 108. In some aspects, the equipment enclosure 108 is located at the base of the tower 102 (e.g., ground level), as shown in FIG. 1, where the baseband unit 110, power supply 116. and power compensator 120 are located within the equipment enclosure 108.

In recent years, a shift has occurred such that the base station transceiver is typically located at or near the top of the tower 102. Radios and transceivers that are located at the top of the tower 102 are typically referred to as a remote radio unit (RRU). Using RRU 106 may significantly improve the quality of the cellular data signals that are transmitted and received by the cellular communication base station 100 as the use of RRU 106 may reduce signal transmission losses and noise. In particular, as the cable 124 running up the tower may be 100-200 feet or more, the signal loss that occurs in transmitting signals at cellular frequencies (e.g., 1.8 GHz, 3.0 GHz, etc.) over the cable 124 may be significant. Because of this loss in signal power, the signal-to-noise ratio of the RF signals may be degraded in systems that locate the radio/transceiver at the bottom of the tower 102 as compared to cellular communication base station 100 where RRU 106 are located at the top of the tower 102 next to the antennas 104 (note that signal losses in the cabling connection between the baseband unit 110 at the bottom of the tower 102 and the RRU 106 at the top of the tower 102 may be much smaller, as these signals are transmitted at baseband frequencies as opposed to RF frequencies).

The RRU 106 receives digital information and control signals from the baseband unit 110 and modulates this information into a radio frequency ("RF") signal that is then transmitted through the antennas 104. The RRU 106 also receives RF signals from the antenna and demodulates these signals and supplies them to the baseband unit 110. The baseband unit 110 processes demodulated signals received from the RRU 106 into a format suitable for transmission over a backhaul communications system 112. The baseband unit 110 also processes signals received from the backhaul communications system 112 and supplies the processed signals to the RRU 106.

Power supply 116 may also be provided that generates suitable direct current ("DC") power signals for powering the baseband unit 110 and the RRU 106. For example, the RRU 106 is often powered by a (nominal) 48 Volt DC power supply in cellular systems that are currently in use today. A battery backup may also be provided to maintain service for some period during power outages. However, as mentioned above, the RRU 106 is typically located at or near the top of the tower 102, whereas the power supply 116 is located within enclosure 108 at or near the base of the tower 102. Accordingly, in some aspects, the power generated by the power supply 116 must be routed up the tower 102 for a significant distance. In the illustrated example, the power is delivered up the tower 102 to RRU 106 via a power cable 124. In some examples, power cable 124 is a hybrid connector system (HCS) cable that combines fiber communications (e.g., fiber optic cable 114 connected to baseband unit 110) and DC power (e.g., DC power cable 122 connected to power compensator 120) into a single power cable 124.

Due to a variety of factors, such as cable run distance, load, and environment (e.g., temperature), the power transmitted over power cable 124 may experience voltage loss. Accordingly, aspects of the present disclosure, as provided in the example of FIG. 1, includes a power compensator 120 that is inserted between the power supply 116 and the RRU 106 to compensate for such voltage losses that may occur over power cable 124.

Figure 2:
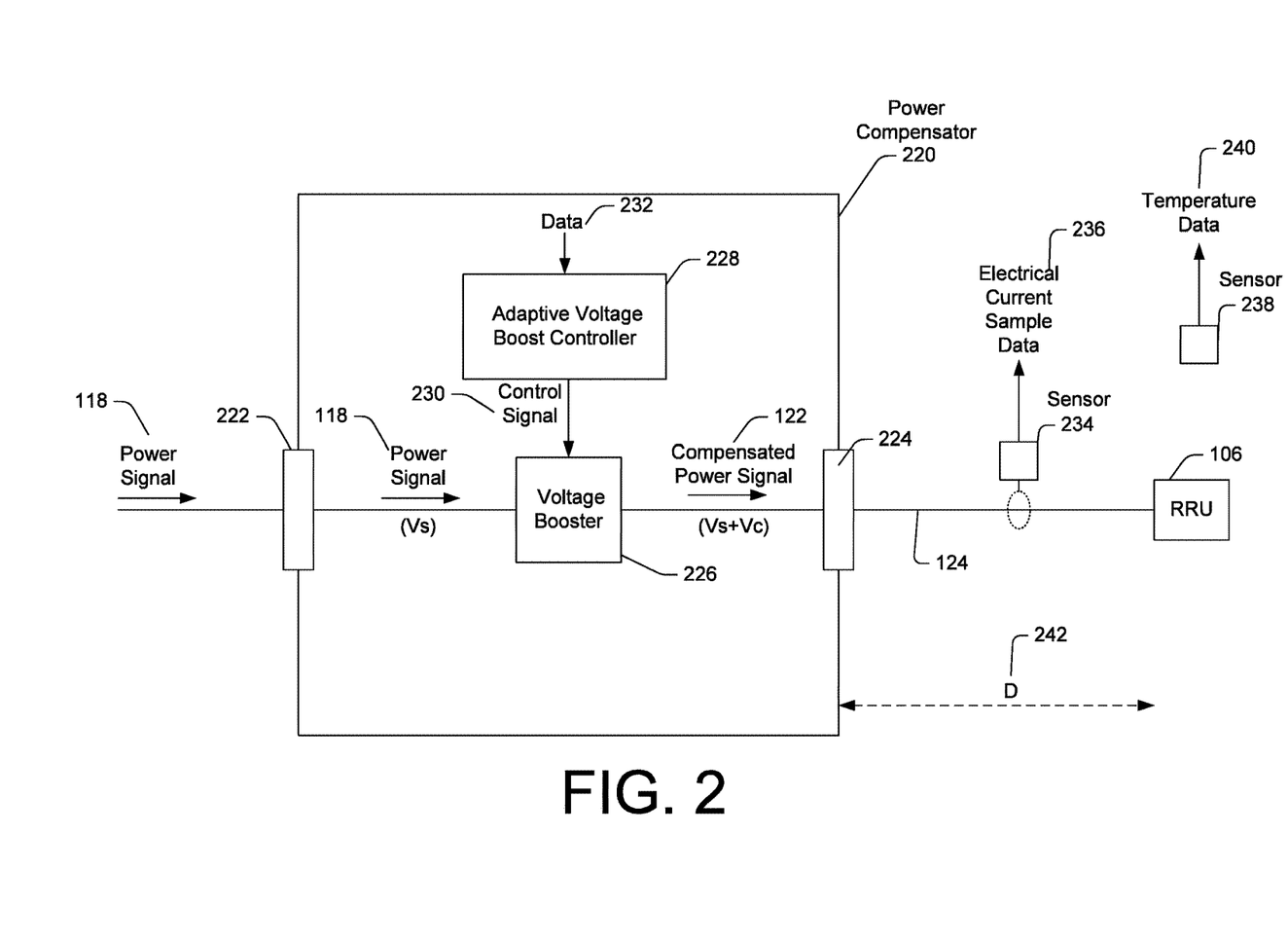
FIG. 2 is an example block diagram illustrating a power compensator for use with a cellular communication base station.

FIG. 2 is an example block diagram illustrating a power compensator 220 for use with a cellular communication base station. Power compensator 220 is one possible implementation of power compensator 120 of FIG. 1. As shown in FIG. 2, the power compensator 220 may include an input port 222, an output port 224, a voltage booster 226, and an adaptive voltage boost controller 228. Also shown in FIG. 2 are a power signal 118 (i.e., corresponding to power signal 118 generated by power supply 116 of FIG. 1), a compensated power signal 122 (i.e., corresponding to compensated power signal 122 illustrated in FIG. 1), a power cable 124, RRU 106, a control signal 230, and data 232.

As mentioned above, the power compensator 220 is inserted between the power supply 116 and the RRU 106. Thus, input port 222 is configured to couple to the power supply 116 to receive the power signal 118 that is generated by the power supply 116. In addition, the output port 224 is configured to couple to RRU 106 via the power cable 124 to provide a compensated power signal 122 to the RRU 106.

Voltage booster 226 is configured to apply a voltage boost to the power signal 118 to generate the compensated power signal 122. In some examples, the voltage boost is an increase in DC voltage of the power signal 118 such that a value of the DC voltage of the compensated power signal 122 is equal to a DC voltage (Vs) of the power signal 118 plus the DC voltage (Vc) of the voltage boost.

In operation, the voltage booster 226 is configured to apply the voltage boost in response to a control signal 230 that is generated by the adaptive voltage boost controller 228. In some examples, voltage booster 226 is a DC power converter, such as a switched-mode power supply, configured to increase the DC voltage of the power signal 118. Thus, in this example, the control signal 230 may direct the switched-mode power supply of the voltage booster 226 to adjust a switching frequency and/or a duty cycle of the switched mode power supply to increase or decrease the applied voltage boost.

The adaptive voltage boost controller 228 is configured to determine a value of the voltage boost (e.g., Vc) based on data 232. In some examples, data 232 includes temperature data that is representative of an ambient temperature of the cellular communication base station 100. For example, power compensator 220 may obtain temperature data 240 from one or more temperature sensors 238 that are disposed proximate to the cellular communication base station 100. That is, cellular communication base station 100 may include one or more temperature sensors 238, such as a thermocouple, to measure the ambient temperature (air temperature) on and/or around the cellular communication base station 100. The temperature sensors 238 may be affixed to the tower 102, the RRU 106, the antennas 104, the power cable 124, and/or the enclosure 108.

As will be described in more detail below, a change in ambient temperature may affect the voltage loss incurred across power cable 124 between the power compensator 120 and the RRU 106. Thus, the adaptive voltage boost controller 228 may be configured to adjust a value of the voltage boost applied by the voltage booster 226 based, in part, on one or more temperature data 240 received from the temperature sensors 238.

In another example, the adaptive voltage boost controller 228 may communicate with one or more weather service servers (not illustrated) to obtain temperature data via a network interface, where the weather service servers provide current ambient temperatures of a region associated with the cellular communication base station. For example, the adaptive voltage boost controller 228 may be configured to query the weather service server with a known location of the cellular communication base station (e.g., zip code, address, lat/long, etc.) to obtain the current and/or expected temperature for the associated region. The adaptive voltage boost controller 228 may then use the retrieved temperature to determine a value of the voltage boost.

Even still, the data 232 utilized by the adaptive voltage boost controller 228 may include electrical current sample data 236. In some examples, one or more current sensors 234 may be disposed along the power cable 124 to measure the electrical current through the power cable 124. In some aspects, the current sensor 234 is a hall effect sensor that uses inductance to detect the current that is flowing through the power cable 124 without electrically connecting to the power cable 124. For example, the hall effect sensor may be attached or placed in proximity to an exterior of the power cable between the output port 224 and the RRU 106. As will be further described below, the adaptive voltage boost controller 228 may determine a value of the voltage boost to be applied to the power signal 118 based, in part, on the electrical current sample data 236.

Figure 3:
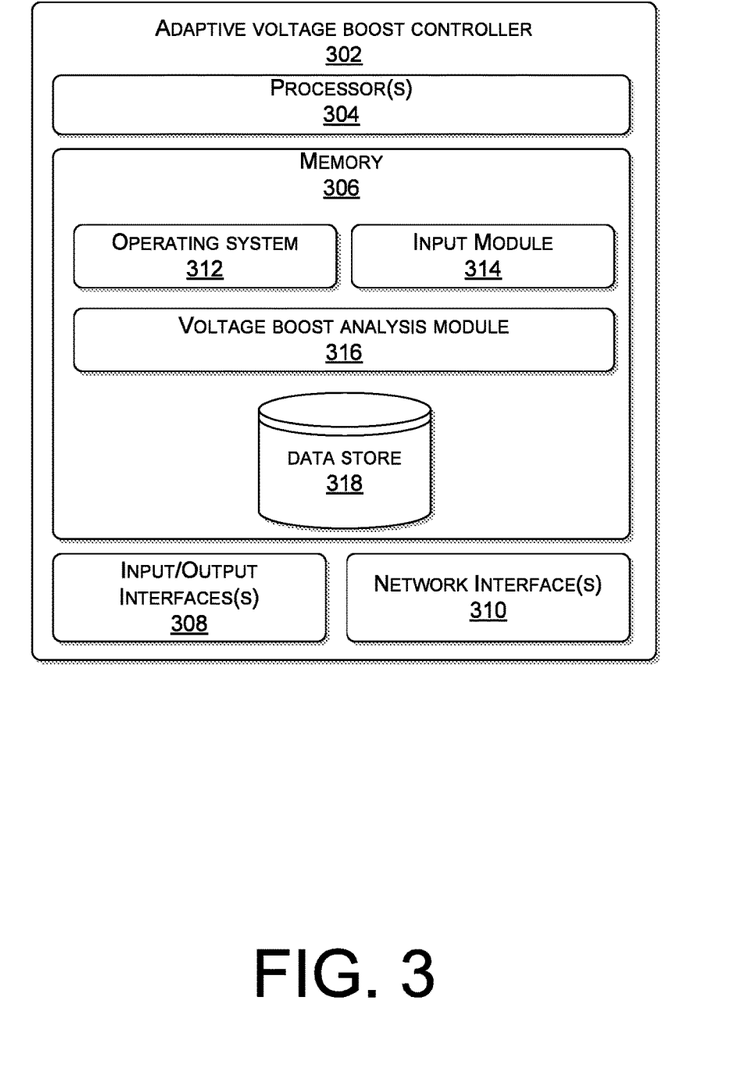
FIG. 3 is an example block diagram illustrating an adaptive voltage boost controller for use in a power compensator.

FIG. 3 is an example block diagram illustrating an adaptive voltage boost controller 302 for use in a power compensator. Adaptive voltage boost controller 302 is one possible implementation of adaptive voltage boost controller 228 of FIG. 2.

The adaptive voltage boost controller 302 is shown as including one or more processor(s) 304, memory 306, one or more input/output interface(s) 308, and one or more network interface(s) 310. The memory 306 may further include an operating system 312, and input module 314, a voltage boost analysis module 316, and a data store 318. The input module 314 may be configured to receive sensor data from one or more sensor(s) (e.g., electrical current sample data 236 and temperature data 240). The voltage boost analysis module 316 may be configured to determine a value of voltage boost (Vc).

Each of the processors 304 may be a single-core processor or a multi-core processor. Memory 306 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer-readable instructions, data structures, program modules, or other data. Computer storage media includes, but is not limited to RAM, ROM, EEPROM, flash memory or other memory technology, CD-ROM, digital versatile disks (DVD), Blu-Ray, or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

In some aspects, the voltage boost analysis module 316 may calculate a value of the voltage boost based on the electrical current sample data 236 as follows:

$$Vc=(Rmc*D)(I)-Vs,$$

where Vc is the value of the voltage boost to be applied to the power signal 118, Rmc is the resistance material coefficient of the power cable 124, D is the distance between the power compensator 120 and the RRU 106 (e.g., see distance D 242 of FIG. 2, where distance D 242 represents the total length of the power cable 124 between the second port 224 and the RRU 106), I is the value of the electrical current sample data 236, and Vs is the DC voltage value of the power signal 118.

However, as mentioned above, the amount of voltage loss incurred across power cable 124 may vary, based in part, on the ambient temperature of the cellular communication base station 100. Accordingly, voltage boost analysis module 316 may be further configured to calculate an adjusted resistance of the power cable 124 based on the temperature data 240. For example, in some aspects, data store 318 may include a reference resistance of the power cable 124 at a reference temperature. That is, the data store 318 may include data that indicates a reference resistance for the distance D (i.e., distance D 242) for a reference temperature. Thus, voltage boost analysis module 316 may calculate an adjusted resistance of the power cable 124 as follows:

$$Rc=R0*(1+K(Tc-T0)),$$

where Rc is the adjusted resistance, R0 is the reference resistance, K is a constant representing a rate of change in resistance of the power cable 124 per change in degree of the ambient temperature, Tc is the ambient temperature (e.g., temperature data 240), and T0 is the reference temperature.

Accordingly, in some implementations, the voltage boost analysis module 316 may then calculate a value of the voltage boost based on the adjusted resistance of the power cable 124 and the electrical current sample data 236 as follows:

$$Vc=(Rc)*(I)-Vs.$$

In some implementations, the data store 318 may include a voltage compensation table that correlates values of voltage boost with net-first voltage outputs measured at sample-points along a length of power cable 124 routed between the power compensator and RRU 106. The data store 318 may further include historical instances of voltage boost that occur in response to historical voltage output, network congestion, meteorological events, and/or so forth. Voltage boost analysis module 316 may further include a machine-learning engine that is configured to dynamically calculate the correct compensation voltage for different scenarios by taking into account RRU performance data.

In some aspects, the voltage boost analysis module 316 is configured to periodically receive temperature data and/or electrical current sample data at regular time intervals. At each time point, the voltage boost analysis module 316 may solve for the value of the voltage boost Vc and generate the appropriate control signal 230 to adjust the voltage boost applied by the voltage booster 226.

In some aspects, when the adaptive voltage boost controller 302 is initially started the power compensator 120 is operated in bypass mode for an initial time period (e.g., 5 min) This allows all radios (e.g., RRU 106) to boot and start to draw power. After the system stabilizes the adaptive voltage boost controller will engage at a 3-volt voltage boost level (e.g., Vc=3V). In some examples, this may be the lowest value for the voltage boost provided by the voltage booster 226.

In some examples, the system reaction time to increase the voltage boost will be slow (e.g., 1 volt step per 4 min period increase). For example, if the system needs 6 volts of boost to make up for voltage loss across power cable 124 it would take 12 min to raise to that voltage. Accordingly, the "walkup" increments for increasing the voltage boost may be limited (e.g., 0.250 volts per minute). In some cellular communication base stations, systems loads are due to data/voice traffic; that pattern can take hours to significantly change to the point that an adjustment the boost voltage may be needed to keep the radios (tower top) between 50 and 57.5 volts. However, if for some reason the load were to drop due to a restart or back haul fail to ensure that the voltage does not jump to an unsafe point, it may be important that the adaptive voltage boost controller 302 drop the boost voltage at a much faster pace and step size. For example, if the load drops by more than 40% over a 5 second period the voltage boost will drop back to 3 volts immediately.

In some examples, the adaptive voltage boost controller 302 is configured to correct the boost voltage when the voltage received at the RRU 106 is out of a voltage window. For example, if the voltage at the RRU 106 is between 52V and 56V, then the adaptive voltage boost controller 302 may do nothing (i.e., do not adjust the value of the voltage boost). However, if the load changes to the point that the voltage is outside that window, the converter will then calculate the correction and adjust accordingly and continue to monitor that algorithm endlessly.

The adaptive voltage boost controller 302 may also be provided with performance data of the RRU 106. For example, the adaptive voltage boost controller 302 may adjust the value of the voltage boost for different combinations of electrical current sample data 236 and a number of data packets dropped by the RRU 106. Thus, if the electrical current sample data 236 indicates that the voltage at the RRU 106 is below a voltage threshold value, and the number of dropped data packets exceeds a first drop threshold value, the adaptive voltage boost controller 302 may generate a first value for the voltage boost. However, if the voltage at the RRU 106 is determined to be below the voltage threshold value, and the number of dropped data packets exceeds a second drop threshold value that is higher or lower than the first drop threshold value, the adaptive voltage boost controller 302 may generate a second value for the voltage boost. For example, the value of the voltage boost may be higher for a larger number of dropped data packets and lower for a lesser number of dropped data packets.

As mentioned above, in some implementations, the adaptive voltage boost controller may implement a machine-learning engine that is configured to dynamically calculate the correct compensation voltage for different scenarios by taking into account transceiver performance data. In some examples, the machine learning engine may implement a machine learning technique that is a supervised, unsupervised, or a reinforcement learning technique. Examples of supervised learning techniques include K-nearest neighbor (KNN), Naive Bayes, logistic regression, support vector machine (SVM), and others. Other supervised learning analysis techniques include linear or polynomial regression analysis, decision stress analysis, and random forests analysis. Examples of unsupervised learning analysis techniques include association analysis, clustering analysis, dimensionality reduction analysis, hidden Markov model analysis techniques, and others. Examples of clustering analysis techniques include K-means, principal component analysis (PCA), singular value decomposition (SVD), incremental clustering, and probability-based clustering techniques. The reinforcement learning technique may be, for example, a Q-learning analysis technique. The techniques described above are some examples of machine learning techniques that may be utilized by the machine learning engine to generate compensation voltage values. These are not intended to be limiting. In various embodiments, the machine learning engine may receive, at a particular time instance, multiple inputs that includes a specific number of dropped packets, a specific voltage at the RRU 106, temperatures 240 from the temperature sensors 234, etc. Accordingly, the machine learning engine may classify the multiple inputs at the particular time instance into a particular scenario that correlates with a compensation voltage using one or more of the machine learning techniques. In this way, the machine learning engine may repeat such analysis at predetermined time intervals to dynamically adjust the compensation voltage.

Figure 4:
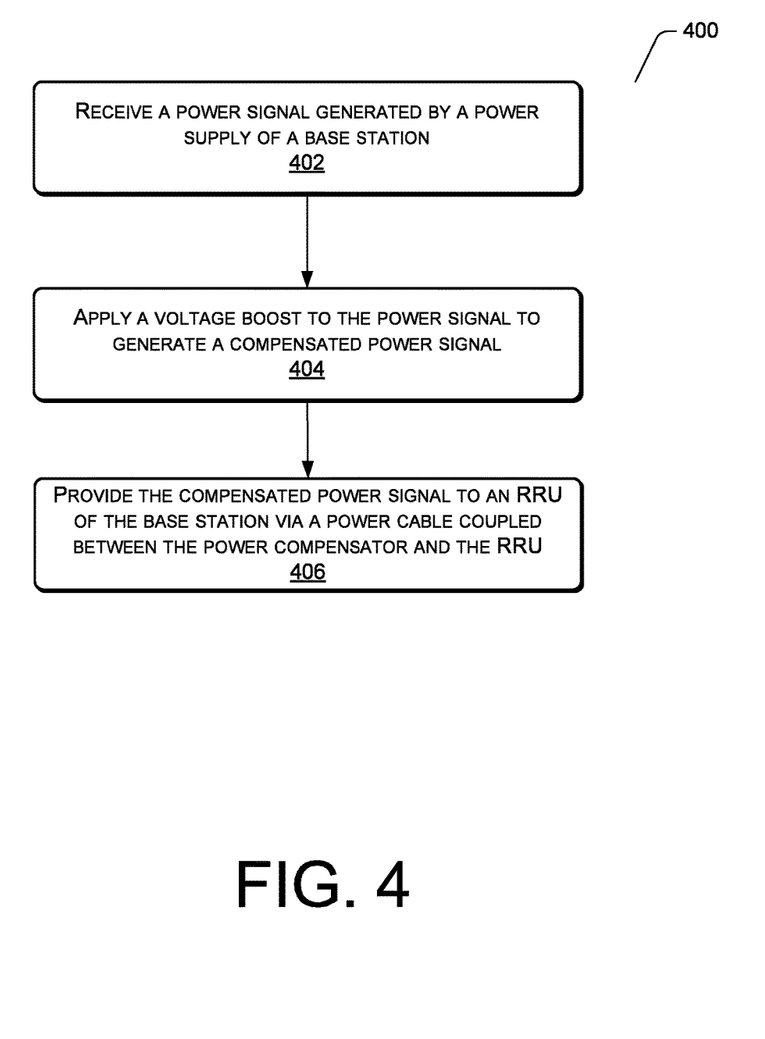
FIG. 4 is a flow diagram of an example process for generating a compensated power signal for a remote radio unit (RRU).
Figure 5:
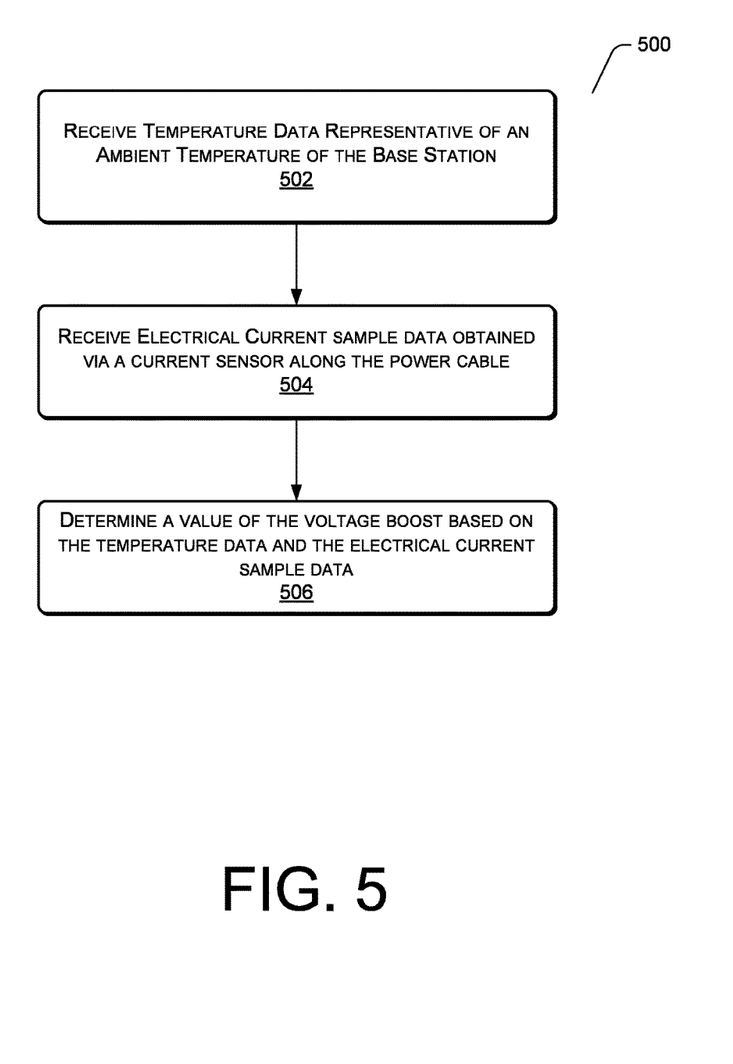
FIG. 5 is a flow diagram of an example process for determining a voltage boost for a power compensator.

FIGS. 4 and 5 present processes 400 and 500 that relate to operations of an adaptive voltage boost controller. Each of processes 400 and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Processes 400 and 500 are example processes performed by the adaptive voltage boost controller 302 of FIG. 3

For example, FIG. 4 is a flow diagram of an example process 400 for generating a compensated power signal 122 for RRU 106. In a process block 402, the input port 222 of the power compensator 220 receives a power signal 118 generated by a power supply 116 of a base station (e.g., cellular communication base station 100 of FIG. 1). Next, in a process block 404, the voltage booster 226 applies a voltage boost (e.g., Vc) to the power signal 118 to generate a compensated power signal 122. In a process block 406, the output port 224 provides the compensated power signal 122 to the RRU 106 via the power cable 124.

FIG. 5 is a flow diagram of an example process 500 for determining a voltage boost for a power compensator. Process 500 is one possible implementation of process block 404 of FIG. 4. In a process block 502, the input module 314 of adaptive voltage boost controller 302 receives temperature data 240, where the temperature data 240 is representative of an ambient temperature of the cellular communication base station 100. Next, in a process block 504, the input module 314 of the adaptive voltage boost controller 302 receives the electrical current sample data 236 that is obtained via one or more current sensors 234 along the power cable 124. In process block 506, the voltage boost analysis module 316 determines the value of the voltage boost based on the temperature data and based on the electrical current sample data. The voltage boost analysis module 316 may then generate the control signal 230 to adjust the voltage boost provided by the voltage booster 226 based on the determined value.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:
1. A power compensator for use in a cellular communication base station, the power compensator comprising:
 a first port to be coupled to a power supply of the base station to receive a power signal generated by the power supply for powering a remote radio unit (RRU) of the base station;
 a second port to be coupled to a power cable connected to the RRU to provide a compensated power signal to the RRU;
 a voltage booster coupled between the first port and the second port to apply a voltage boost to the power signal to generate the compensated power signal; and
 an adaptive voltage boost controller coupled to the voltage booster to control the voltage boost applied by the voltage booster to compensate for a voltage loss across the power cable between the second port and the RRU, wherein the adaptive voltage boost controller comprises:
  at least one processor; and
  at least one memory coupled to the at least one processor, the at least one memory having instructions stored therein, which when executed by the at least one processor, direct the adaptive voltage boost controller to:
   receive temperature data representative of an ambient temperature of the base station;
   receive electrical current sample data obtained via a current sensor disposed along the power cable;
   determine a value of the voltage boost to be applied by the voltage booster based on the temperature data and the electrical current sample data; and
   send a control signal from the adaptive voltage boost controller to the voltage booster to adjust the voltage boost based on the determined value.
2. The power compensator of claim 1, wherein the instructions to receive the temperature data comprises instructions to receive the temperature data from one or more temperature sensors disposed proximate to the base station.
3. The power compensator of claim 1, where the instructions to receive the temperature data comprises instructions to receive the temperature data from one or more weather service servers indicating a current ambient temperature of a region associated with the base station.

4. The power compensator of claim 1, wherein the memory further comprises instructions to direct the adaptive voltage boost controller to:
  determine a reference resistance of the power cable at a reference temperature for a total length of the power cable between the second port and the RRU; and
  calculate an adjusted resistance of the power cable based on the temperature data and the reference resistance, wherein the instructions to determine the value of the voltage boost to be applied by the voltage booster includes instructions to determine the value further based on the adjusted resistance of the power cable.

5. The power compensator of claim 4, wherein the instructions to calculate the adjusted resistance of the power cable includes instructions to calculate the adjusted resistance based on:

$$R_C = R_0(1 + K(T_C - T_o)),$$

where $R_C$ is the adjusted resistance, $R_0$ is the reference resistance, K is a constant representing a rate of change in resistance of the power cable per change in degree of the ambient temperature, $T_C$ is the ambient temperature, and $T_O$ is the reference temperature.

6. The power compensator of claim 5, wherein the instructions to determine the value of the voltage boost comprises instructions to determine the value of the voltage boost based on:

$$V_C R_C * I - V_S,$$

wherein $V_C$ is the value of the voltage boost, $R_C$ is adjusted resistance of the power cable, I is the electrical current sample data, and $V_S$ is a voltage value of the power signal generated at the first port.

7. The power compensator of claim 1, wherein the current sensor comprises a Hall Effect Sensor.

8. The power compensator of claim 1, wherein the voltage booster comprises a Direct Current (DC) to DC power converter configured to increase a DC voltage of the power signal to generate the compensated power signal.

9. The power compensator of claim 8, wherein the DC to DC power converter comprises a switched-mode power supply, wherein the control signal directs the switched-mode power supply to adjust at least one of: a switching frequency of the switched-mode power supply or a duty cycle of the switched-mode power supply.

10. A computer-implemented method for use with a power compensator of a cellular communication base station, the method comprising:
  receiving, at the power compensator, a power signal generated by a power supply of the base station, the power signal generated by the power supply for powering a remote radio unit (RRU) of the base station;
  applying a voltage boost to the power signal to generate a compensated power signal;
  providing the compensated power signal to the RRU via a power cable coupled between the power compensator and the RRU, wherein applying the voltage boost to the power signal comprises:
    receiving temperature data representative of an ambient temperature of the base station;
    receiving electrical current sample data obtained via a current sensor disposed along the power cable; and
    determining a value of the voltage boost to be applied to the power signal based on the temperature data and the electrical current sample data.

11. The computer-implemented method of claim 10, wherein receiving the temperature data comprises receiving the temperature data from one or more temperature sensors disposed proximate to the base station.

12. The computer-implemented method of claim 10, wherein receiving the temperature data comprises receiving the temperature data from one or more weather service servers indicating a current ambient temperature of a region associated with the base station.

13. The computer-implemented method of claim 10, further comprising:
  determining a reference resistance of the power cable at a reference temperature for a total length of the power cable between the power compensator and the RRU; and
  calculating an adjusted resistance of the power cable based on the temperature data and the reference resistance, wherein determining the value of the voltage boost includes determining the value further based on the adjusted resistance of the power cable.

14. The computer-implemented method of claim 13, wherein calculating the adjusted resistance of the power cable includes calculating the adjusted resistance based on:

$$R_C = R_0(1 + K(T_C - T_o)),$$

where $R_C$ is the adjusted resistance, $R_0$ is the reference resistance, K is a constant representing a rate of change in resistance of the power cable per change in degree of the ambient temperature, $T_C$ is the ambient temperature, and $T_O$ is the reference temperature.

15. The computer-implemented method of claim 14, wherein determining the value of the voltage boost comprises determining the value of the voltage boost based on:

$$V_C R_C * I - V_S,$$

wherein $V_C$ is the value of the voltage boost, $R_C$ is the adjusted resistance of the power cable, I is the electrical current sample data, and $V_S$ is a voltage value of the power signal.

16. The computer-implemented method of claim 10, wherein the current sensor comprises a Hall Effect Sensor.

17. The computer-implemented method of claim 10, wherein applying the voltage boost to the power signal to generate the compensated power signal comprises adjusting a switching frequency or duty cycle of a switched-mode power supply.

18. One or more non-transitory computer-readable media storing computer-executable instructions, which when executed by the at least one processor of a power compensator of a cellular communication base station, direct the power compensator to:
  receive, at the power compensator, a power signal generated by a power supply of the base station, the power signal generated by the power supply for powering a remote radio unit (RRU) of the base station;
  apply a voltage boost to the power signal to generate a compensated power signal;
  provide the compensated power signal to the RRU via a power cable coupled between the power compensator and the RRU, wherein the instructions to apply the voltage boost to the power signal comprises instructions to:
    receive temperature data representative of an ambient temperature of the base station;
    receive electrical current sample data obtained via a current sensor disposed along the power cable; and
    determine a value of the voltage boost to be applied to the power signal based on the temperature data and the electrical current sample data.

19. The one or more non-transitory computer-readable media of claim 18, further comprising instructions to:
   determine a reference resistance of the power cable at a reference temperature for a total length of the power cable between the power compensator and the RRU; and
   calculate an adjusted resistance of the power cable based on the temperature data and the reference resistance, wherein determining the value of the voltage boost includes determining the value further based on the adjusted resistance of the power cable.

20. The one or more non-transitory computer-readable media of claim 18, wherein the instructions to calculate the adjusted resistance of the power cable includes instructions to calculate the adjusted resistance based on:

$$R_C = R_0(1 + K(T_C - T_o)),$$

where $R_C$ is the adjusted resistance, $R_0$ is the reference resistance, K is a constant representing a rate of change in resistance of the power cable per change in degree of the ambient temperature, $T_C$ is the ambient temperature, and $T_O$ is the reference temperature.

* * * * *